UNITED STATES PATENT OFFICE.

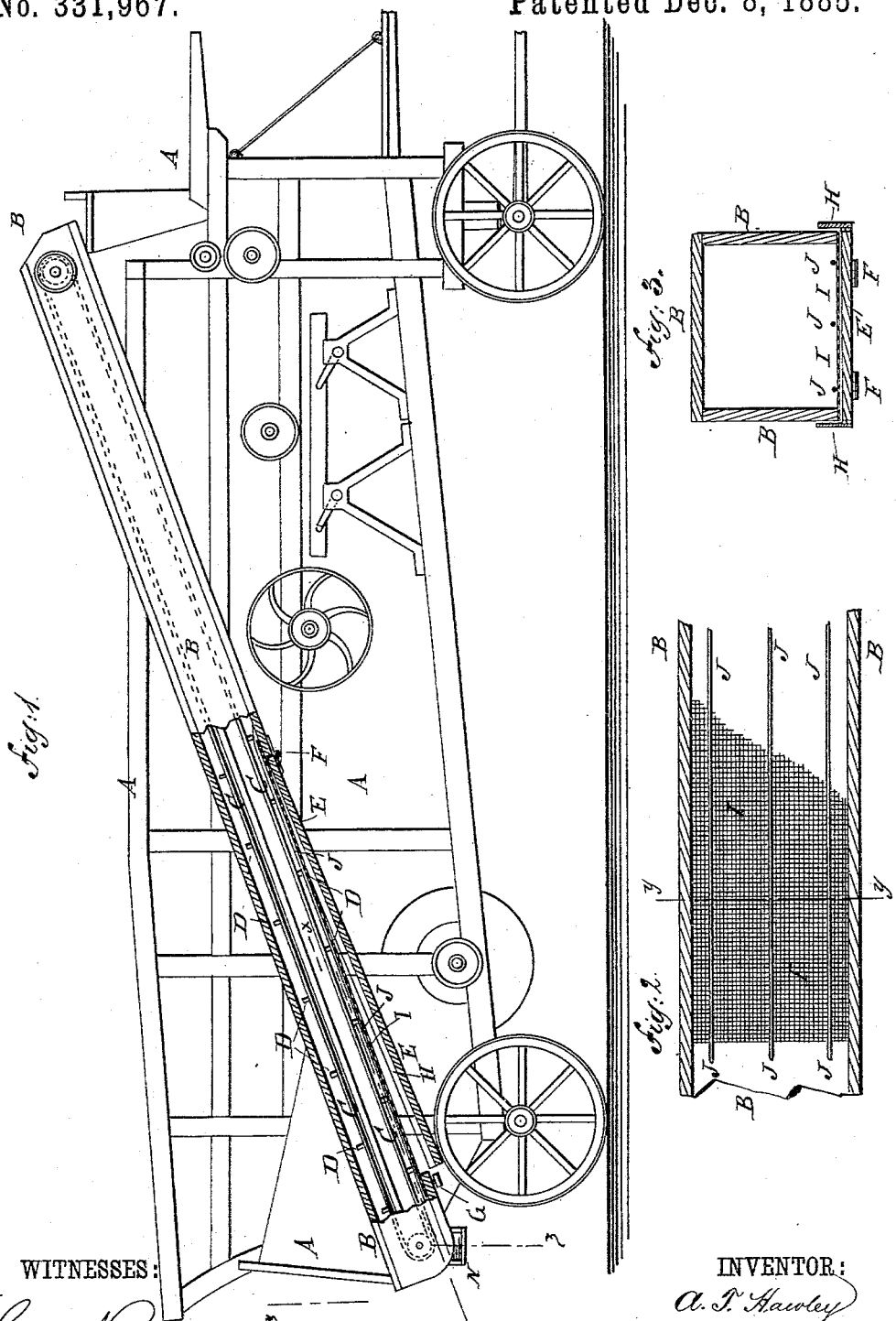

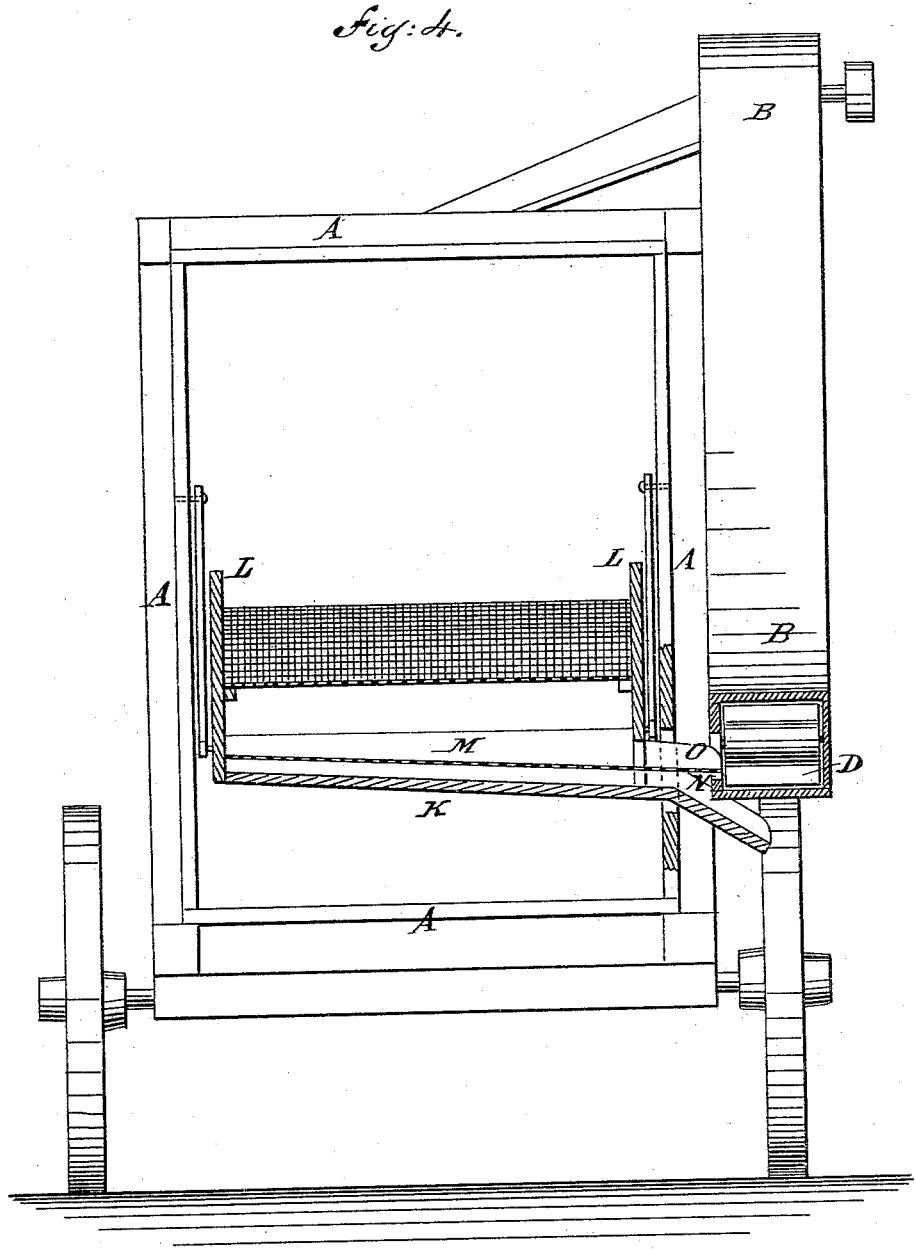

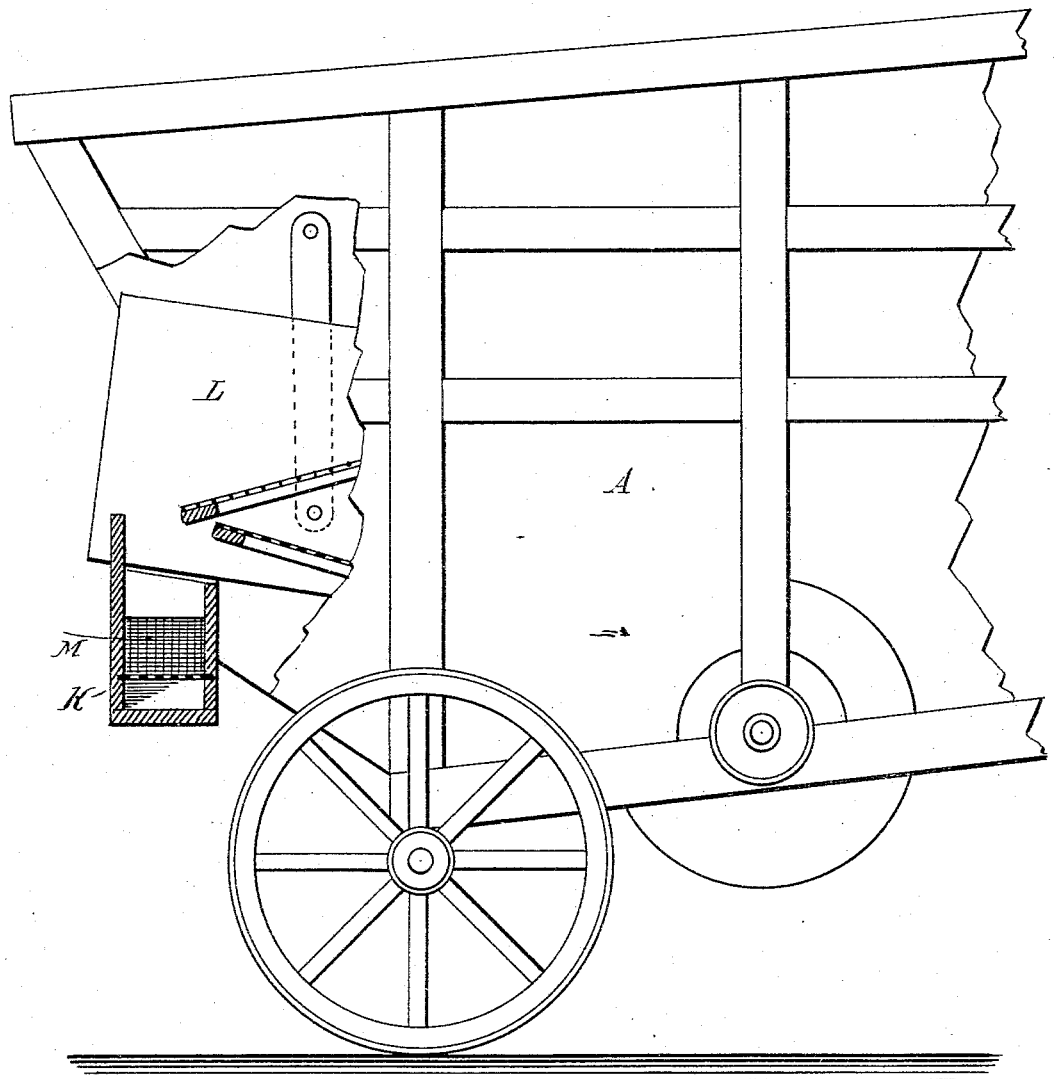

ANDREW T. HAWLEY, OF ALTON, ILLINOIS.

GRAIN-SEPARATOR.

SPECIFICATION forming part of Letters Patent No. 331,967, dated December 8, 1885.

Application filed August 11, 1885. Serial No. 174,117. (No model.)

*To all whom it may concern:*

Be it known that I, ANDREW T. HAWLEY, of Alton, in the county of Madison and State of Illinois, have invented certain new and useful Improvements in Grain-Separators, of which the following is a full, clear, and exact description.

Reference is to be had to the accompanying drawings, forming part of this specification, in which similar letters of reference indicate corresponding parts in all the figures.

Figure 1 is a side elevation, partly in section, of a combined grain thrasher and separator to which my improvement has been applied. Fig. 2 is a sectional plan view of a part of the elevator, enlarged, taken through the line $x\,x$, Fig. 1. Fig. 3 is a sectional end elevation of the elevator, taken through the line $y\,y$, Fig. 2. Fig. 4 is a rear elevation of a combined grain thrasher and separator, partly in section, through the line $z\,z$, Fig. 1. Fig. 5 is a side elevation of a portion of a thrashing-machine, parts being broken away and parts being shown in section.

The object of this invention is to facilitate and promote thoroughness in removing the cheat and other small seeds and impurities from wheat.

The invention consists in the construction and arrangement of parts, as will be hereinafter fully described and claimed.

A represents an ordinary grain thrasher and separator, about the construction and operation of which there is nothing new. B is the elevator-trough, and C is the elevator-belt, to which are attached, at suitable distances apart, lags or bars D, of wood or other suitable material, to serve as rakes to draw the grain up the bottom of the trough B. A portion of the bottom E of the elevator-trough B, at a little distance from the lower end of the said trough, is made separable, and is connected at its upper end with the lower end of the upper stationary part of the trough-bottom by hinges F, so that the lower end of the said separable bottom E can be lowered to rest upon a wheel of the machine-carriage or other suitable support.

The separable bottom E is secured in place, when raised, by a button, G, pivoted to the lower stationary part of the trough-bottom, or by other suitable fastening.

To the side edges of the separable bottom E are attached upwardly-projecting flanges H, of sheet-iron or other suitable material, to adapt the said bottom E to serve as a spout to conduct the cheat and other fine seeds and impurities that fail to pass through the screen M, which will be presently described, to some suitable receiver.

The opening formed in the bottom of the elevator-trough B is covered with a wire screen, I, of such a fineness of mesh as to prevent kernels of wheat from passing through, while allowing cheat and other fine seeds and impurities to pass through freely. The wire screen I is protected from being worn or injured by the friction of the elevator lags or bars D by wires J, placed upon the said screen I longitudinally with the elevator-trough B and attached at their ends to the stationary parts of the trough-bottom, so that the said wires will serve as ways for the said elevator lags or bars D, to slide upon, while allowing the said lags or bars to come so close to the said screen that no kernels of wheat will be left upon the screen. With this construction cheat and other small seeds and impurities will be removed from the wheat as the said wheat is being carried up the elevator.

In the trough K of the shoe L is placed a screen, M, of such fineness of mesh that cheat and other small seeds and impurities will pass through it and slide down the bottom of the said trough K to the discharge spout or opening N, through which they pass out of the separator, while the wheat passes from the lower end of the screen M through the spout O into the elevator B, and is further screened as it is being carried up the said elevator.

Having thus described by invention, I claim as new and desire to secure by Letter Patent—

1. The combination, with the elevator-trough B, having a bottom opening, the elevator-belt C, and lags D, of the screen I and the guard-wires J, extended longitudinally above said screen, substantially as herein shown and described, and serving to protect the screen and grain from injury, and also as tracks for the lags D.

2. The combination, with the elevator-belt C D, and trough B, having a bottom opening, and a screen, I, of the hinged bottom E, having side flanges, H, substantially as herein shown and described, whereby the fine seeds and impurities separated from the wheat can be conducted to a receiver, as set forth.

A. T. HAWLEY.

Witnesses:
FRED GASKINS,
DEXTER T. FERGUSON.